US006887725B2

(12) United States Patent
Oda et al.

(10) Patent No.: US 6,887,725 B2
(45) Date of Patent: May 3, 2005

(54) MICRO ELECTRON GUN OF QUANTUM SIZE EFFECT TYPE AND FLAT DISPLAY USING SUCH ELECTRON GUNS AS WELL AS METHODS OF THEIR MANUFACTURE

(75) Inventors: Shunri Oda, Tokyo (JP); Xinwei Zhao, Tokyo (JP); Katsuhiko Nishiguchi, Tokyo (JP)

(73) Assignee: Japan Science and Technology Agency, Kawaguchi (JP)

( * ) Notice: Subject to any disclaimer, the term of this patent is extended or adjusted under 35 U.S.C. 154(b) by 0 days.

(21) Appl. No.: 10/667,517

(22) Filed: Sep. 23, 2003

(65) Prior Publication Data

US 2004/0055530 A1 Mar. 25, 2004

Related U.S. Application Data

(62) Division of application No. 10/275,959, filed as application No. PCT/JP01/04221 on May 21, 2001, now Pat. No. 6,661,021.

(30) Foreign Application Priority Data

May 23, 2000 (JP) ........................................ 2000-151448

(51) Int. Cl.[7] ............................ H01L 21/00; H01J 1/30; H01J 9/02
(52) U.S. Cl. ......................... 438/20; 438/770; 438/771
(58) Field of Search ............................... 438/20, 22, 48, 438/117, 770, 771

(56) References Cited

U.S. PATENT DOCUMENTS

| 5,336,902 A | 8/1994 | Nigaki et al. ................. 257/10 |
| 6,181,055 B1 | 1/2001 | Patterson et al. ............ 313/310 |
| 6,607,593 B2 * | 8/2003 | Kuribayashi et al. ......... 117/11 |

FOREIGN PATENT DOCUMENTS

| JP | 5-206515 | 8/1993 |
| JP | 6-269659 | 9/1994 |
| JP | 8-111166 | 4/1996 |
| JP | 9-7499 | 1/1997 |
| JP | 9-259795 | 10/1997 |
| JP | 10-269932 | 10/1998 |
| JP | 11-135830 | 5/1999 |
| JP | 2966842 | 10/1999 |
| JP | 2981740 | 11/1999 |

OTHER PUBLICATIONS

T. Ifuku et al.; Japan J. Appl. Phys., Part 1, vol. 36, No. 6(B), pp. 4031–4034, Jun. 1997, See PCT search report.

A. Dutta et al.; Japan J. Appl. Phys., Part 1, vol. 39, No. 1, pp. 264–267, Jan. 2000. See PCT search report.

* cited by examiner

Primary Examiner—Amir Zarabian
Assistant Examiner—Pamela Perkins
(74) Attorney, Agent, or Firm—Westerman, Hattori, Daniels & Adrian, LLP

(57) ABSTRACT

A micro electron gun that is capable of extracting electrons from a semiconductor utilizing a quantum size effect and that can be mounted individually for each of pixels is disclosed, as well as a picture display apparatus using such electron guns which is high in quantum efficiency, of high brightness and thin, as well as methods of manufacture thereof. Conduction electrons from a n-type semiconductor substrate (2) are accelerated under an electric field through a layer or layers (4) of quantum size effect micro particles (3) formed on surfaces of the n-type semiconductor substrate (2) and passed therethrough without undergoing phonon scattering, so that they when arriving at an electrode (5) may possess an amount of energy not less than the work function of the electrode (5) and are thus allowed to spring out into a vacuum. Such a quantum size effect micro particle (3) comprises a micro particle of a single crystal semiconductor in a nanometer order having electron energy levels made so discrete that no phonon scattering is brought about, and on its surface area an insulator so thin that an electron is capable of tunneling therethrough.

6 Claims, 10 Drawing Sheets

A

B

C

MICRO ELECTRON GUN OF QUANTUM SIZE EFFECT TYPE AND FLAT DISPLAY USING SUCH ELECTRON GUNS AS WELL AS METHODS OF THEIR MANUFACTURE

CROSS REFERENCE TO RELATED APPLICATION

This application is a divisional application of U.S. patent application Ser. No. 10/275,959, filed Nov. 18, 2002, now U.S Pat. No. 6,661,021, which is a national stage application under §371 of international application No. PCT/JP01/04221, filed on May 21, 2001.

TECHNICAL FIELD

The present invention relates to a micro electron gun and a flat display apparatus with an array of micro electron guns as well as methods of their manufacture.

BACKGROUND ART

In receivers for television, and monitor displays for personal computers, it has been traditional to use either a CRT (cathode ray tube) set or a LCD (liquid crystal display).

A CRT is made up of an electron gun, a deflector for sweeping an electron beam projected from the electron gun and a fluorescent screen that illuminates when it has an electron beam impinging thereon. The electron gun is formed, e.g., of a filament made of a resistor such as a tungsten wire, and a focusing coil for focusing thermoelectrons emitted from the filament.

Designed to heat the filament by passing electric current through it to emit thermoelectrons, an electron gun of this type is poor in energy efficiency for extracting the electrons into a required beam, since a portion of the electric energy is consumed to emit light and heat. Such electron guns are also deficient in safety, because they entail a high voltage and an elevated temperature.

An electron gun of field emission type is also available in which a high voltage is applied to a pointed metal or semiconductor and an electron beam is extracted using an electric field concentrated at this pointed end. Energy efficiency is poor here, too, because of the need for a high voltage.

Because the deflector deflect the direction of travel of an electron beam by an electromagnetic force, it must be capable of attaining greater angles of deflection for corresponding to a large fluorescent surface, namely the screen, so it is necessary that the deflector has a large volume in size or applied in a big electrical power.

Thus, the electron guns in the CRT system are as poor in energy efficiency as 0.01% (in quantum efficiency as 0.1%), and are hence unsuitable for a power saving apparatus. Further, in the principles of their operation they can not be made thin, and hence it is impossible for them to be made flat such as for a wall type television.

In order to solve the problems of the CRT system, the LCD device has come to spread widely. The LCD device, however, has left the problems mentioned below.

The LCD device is made up of a backlight panel as a light source, a liquid crystal and a polarizer interposed between substrates which have electrodes for controlling the light transmittance of each of the pixels, a color filter, and a drive circuit for applying voltages to the electrode.

In any LCD device of this type, the attempt to raise its brightness requires raising the brightness of the backlight panel light source, but this entails raising the brightness of pixels that are not required to raise its brightness. Hence, poor energy efficiency ensues here. Further, the backlight panel light source, which is made up of fluorescent tubes or a LED array panel or an EL panel, is hard in the principles of its operation to obtain as high a brightness as in the CRT system.

Also, in recent years there has been proposed an image display system which by using an electron gun for each of the pixels can be made as thin as the LED system and provides a brightness as high as with the CRT system. The electron gun in this system is an electron gun of field emission type having a pointed area for each pixels, and the display is constituted by these pixels which are formed on, e.g., the surface of a semiconductor substrate by machining the semiconductor surface. In such a system, it is technologically difficult to machine so that a pointed area may be formed for each of the pixels, and there is also the problem that even if being effective the electric field concentration of the pointed area, even high voltage is needed in order to extract electrons from the semiconductor. For these reasons, the system has not yet been put to practical use.

In sum, the conventional image displays as mentioned above leave the problems unsolved that they are poor in energy efficiency, incapable of being made thin and much unsatisfactory in brightness.

With those problems taken into account, it is an object of the present invention to provide an electron gun of quantum size effect type which by using a quantum size effect makes it possible to extract electrons easily from a semiconductor and can be allocable as each of pixels.

It is another object of the present invention to provide an image display apparatus using such electron guns that is high in quantum efficiency, high in brightness and small in thickness.

It is a further object of the present invention to provide methods of making an electron gun of quantum size effect type and an image display apparatus as mentioned above.

DISCLOSURE OF THE INVENTION

In order to achieve the objects mentioned above, as set forth in claim 1 and in the appended claims there is provided in accordance with the present invention a micro electron gun of quantum size effect type, characterized in that it comprises a semiconductor substrate and an electrode; and a layer or layers of micro particles having a quantum size effect formed between the said semiconductor substrate and the said electrode whereby an electron conducting between the said semiconductor substrate and the said electrode has a longer mean free path. It is made possible thereby to accelerate an electron under an electric field so as to impart thereto an amount of energy not less than the work function of a substance constituting the electrode, and to take out an electron from the electrode into vacuum.

As set forth in claim 2 in the appended claims, the invention further provides a micro electron gun of quantum size effect type, characterized in that between the said semiconductor substrate and the said electrode the said quantum size effect micro particles are so formed in the said layer or layers that they increase in particle size gradually from the said semiconductor substrate towards the said electrode. The micro electron gun is thereby made operable even with an applied voltage further reduced.

An aforesaid micro particle having a quantum size effect is preferably a quantum size effect micro particle made up of a single crystal semiconductor micro particle having a particle size in a nanometer order and an insulating layer having a thickness in a nanometer order and with which the said single crystal semiconductor micro particle is covered. This makeup permits establishing discrete energy levels as a quantum size effect while making it possible for an electron to tunnel.

The said single crystal semiconductor micro particle is preferably a silicon single crystal micro particle, and the said insulating layer with which the same is covered is then formed of either a silicon oxide or a silicon nitride film.

The present invention also provides in another aspect thereof a flat display apparatus characterized in that it comprises a planar array of micro electron guns of quantum size effect type and a fluorescent plate mounted above the planar array of the said micro electron guns.

An aforesaid micro electron gun of quantum size effect type for use in the flat display apparatus comprises a semiconductor substrate and an electrode; and a layer or layers of micro particles having a quantum size effect formed between the said semiconductor substrate and the said electrode whereby an electron conducting between the said semiconductor substrate and the said electrode is supplied with an increased mean free path.

Preferably, in the said micro electron gun of quantum size effect type, the said quantum size effect micro particles are so formed in the said layer or layers between the said semiconductor substrate and the said electrode that they increase in particle size gradually from the said semiconductor substrate towards the said electrode.

The flat display made to include the planar array of electron guns and the fluorescent plate may comprise a plurality of lower electrodes made of semiconductor and arranged in a form of stripes; a layer or layers of quantum size effect micro particles as aforesaid formed on the said lower electrodes; a plurality of upper electrodes formed on the said layer or layers of quantum size effect micro particles and arranged in a form of stripes extending orthogonally to those forming the said upper electrodes, wherein respective regions of intersection of the said upper and lower electrodes (as seen through from top or bottom) together with portions of the said layer(s) of quantum size effect micro particles interposed between the said respective regions of intersection make up the said arrayed micro electron guns for pixels whereby a selected one of the said pixel may be illuminated when a driving voltage is applied across a particular pair of the said upper and lower electrodes correspondingly selected.

The present invention further provides in yet another aspect thereof a method of making quantum size effect micro particles, characterized in that it comprises the steps of: introducing silane into a VHF-band plasma of argon while controlling the time duration in which the silane is so introduced to form Si single crystal micro particles with their particle size controlled; forming on a substrate a layers of such Si single crystal micro particles so formed; and converting respective surface areas of the said Si single crystal micro particles in the said layer on the said substrate in the presence of a gaseous atmosphere into insulating films.

Here, the said Si single crystal micro particles may be formed by forming $SiH_2$ radical, $SiH_3$ radical and $SiH_n^+$ ions (where n=0 to 3) in the said VHF-band plasma of argon; forming nuclei of the Si single crystal micro particles from the $SiH_2$ radical; and bonding the $SiH_3$ radical and $SiH_n^+$ ions (where n=0 to 3) to the said nuclei to cause the latter individually to crystallographically grow, thereby forming the Si single crystal micro particles.

The step of forming a layer of Si single crystal micro particles may also include causing the Si single crystal micro particles to diffuse following a concentration gradient thereof, followed by their arrival to and deposition on the said substrate, forming there said layer thereof.

Also, the insulating layers on the surfaces of the Si single crystal micro particles may be formed by exposing the said Si single crystal micro particles to a gas atmosphere of $O_2$ or $N_2$ or to a gas plasma of $O_2$ or $N_2$.

Further, layers of Si single crystal micro particles may be formed by repeating the aforementioned process steps for making a layer of Si single crystal micro particles.

In the methods mentioned above, it is also possible to control the particle size of the said Si single crystal micro particles by controlling the time duration in which silane is introduced into the said VHF-band plasma of argon.

It should be noted here that when a voltage is applied across a semiconductor crystal, a conduction electron in the crystal is accelerated under the resulting electric field to gain energy. Thus, taking out an electron from the crystal into a vacuum may make it sufficient to accelerate the electron so as to impart thereto an amount of energy not less than the work function of the crystal. In a material where an electron undergoes scattering by an impurity atom, a lattice defect or a phonon, however, it is not possible to accelerate an electron over a distance exceeding its mean free path.

While the mean free path can be increased by lessening impurity atoms and crystal defects, it is not possible to increase the mean free path against the phonon scattering which is based on the crystal structure itself.

By the way, in a Si single crystal in which impurity atoms and crystal defects can be neglected an electron is given a mean free path of about 50 nm. Accelerating the electron over a distance of this mean free path of 50 nm so that it gains, e.g., 50 eV, of energy that is the work function of gold requires a field strength of $10^8$ V/m, which comes to exceed an avalanche breakdown voltage of $3 \times 10^7$ V/m of Si single crystal. It follows, therefore, that an electron cannot be taken out from Si single crystal and, indeed, not only from Si semiconductor but from any known semiconductor crystal.

It may be noted in passing that the phenomenon that an electron is scattered by a phonon is a collision process in which both energy and momentum are conserved. To wit, a collision may occur between an electron lying at one of the energy levels of the conduction band and a phonon as a quantized lattice vibration having an energy of about KT (where K is the Boltzmann's constant and T is the absolute temperature). Then, the electron upon either absorbing, or emitting a phonon may make transition either to an energy level in the conduction band that has the energy being added the energy of the phonon to the energy of the electron before the collision, or to an energy level in the conduction band that has the energy being subtracted the energy of the phonon from the energy of the electron before the collision. Also with the momenta being conserved as well, the electron changes its direction of motion depending on the direction in which it impinges the phonon.

The collision process to occur in this manner requires an empty energy level that corresponds to the energy of the conduction electron after the collision. The phonon's energy being about KT, it is necessary that there exist such an empty energy level for the conduction electron in a neighborhood of about KT above or below its energy level before the collision.

In a crystal of ordinary size, energy levels in the conduction band are distributed almost continuously and densely, and the existence of an empty energy level for a conduction electron after collision causes a collision process to occur between the conduction electron and a phonon, and thus the conduction electron to be scattered by the phonon.

By the way, it is well known that an electron confined in a potential well has its discrete energy levels made higher as the width D of the potential well is made smaller; hence the difference between adjoining energy levels is then made larger as well. This effect is herein referred to as "quantum size effect".

Thus, making the width D of a potential well small makes it possible to utilize its quantum size effect and in turn to derive an energy level width (difference) that is greater than KT. It is then made possible to increase the mean free path of an electron to an extent that it is no longer scattered by a phonon.

The present invention is therefore predicated on the use of this effect whereby electrons in a semiconductor in the course of their acceleration under an electric field are supplied with an increased mean free path so as to acquire an amount of energy not less than the work function of a material and thereby taken out thereof into a vacuum.

BRIEF DESCRIPTION OF THE DRAWINGS

The present invention will better be understood from the following detailed description and the drawings attached hereto showing certain illustrative embodiments of the present invention. In this connection, it should be noted that such forms of embodiment illustrated in the accompanying drawings hereof are intended in no way to limit the present invention but to facilitate an explanation and understanding thereof. In the drawings:

FIG. 11 is a graph showing that the particle size of a micro particle of quantum size effect varies as a function of the time duration of a pulse in which $SiH_4$ gas is let in;

BEST MODES FOR CARRYING OUT THE INVENTION

Figure 1:
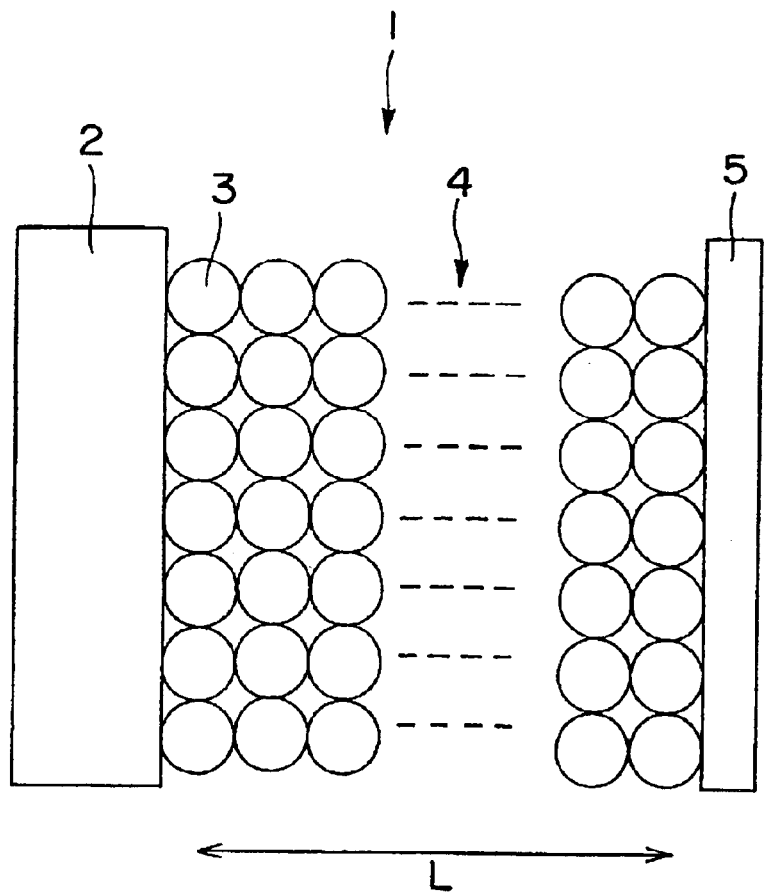
FIG. 1 is a diagrammatic structural view illustrating a first form of embodiment of the micro electron gun of quantum size effect type according to the present invention.

Hereinafter, the present invention as regards a micro electron gun of quantum size effect type and a flat display apparatus using such electron guns as well as methods of manufacture thereof will be described in detail with reference to suitable, presently best forms of embodiment thereof illustrated in the drawing figures. In the drawing figures, it should be noted that the same reference characters are used to designate substantially the same or corresponding components.

An explanation is first given in respect of the makeup and operation of a first form of embodiment of the micro electron gun of quantum size effect type according to the present invention.

FIG. 1 is a diagrammatic structural view illustrating a first form of embodiment of the micro electron gun of quantum size effect type according to the present invention. Referring to FIG. 1, the micro electron gun of quantum size effect type designated by reference character 1 comprises a substrate 2 made of an n-type semiconductor, quantum size effect micro particles 3 piled up in a layer of tiers 4 (having a thickness L) on and above one side surface of the substrate 2, and an electrode 5 formed on this layer 4 of tiers of the micro particles 3.

Figure 2:
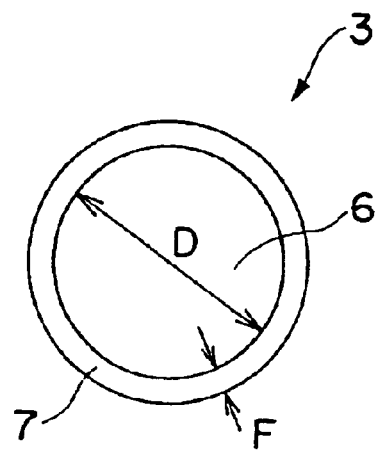
FIG. 2 is a diagrammatic cross sectional view illustrating a quantum effect micro particle.

Referring to FIG. 2 that is a diagrammatic cross sectional view illustrating a quantum size effect micro particle 3 is made of a single crystal micro particle 6 having a particle size D in a nanometer order and an insulating or nonconductive film 7 having a thickness F in a nanometer order with which the single crystal micro particle 6 is covered.

In this form of embodiment, the n-type semiconductor substrate 2 may be formed of low resistance n-type Si, the layer 4 of piles of the micro particles 3 of quantum size effect has the thickness L that may be 1 micrometer, the electrode 5 may be made of gold, the single crystal semiconductor micro particle 6 may have the particle size D of 5 nm as formed of Si single crystal (which may be referred to herein as "nano-Si crystal"), and the insulating film 7 may be formed of a silicon oxide film or a silicon nitride film having the thickness F of 1 nm.

Figure 13:
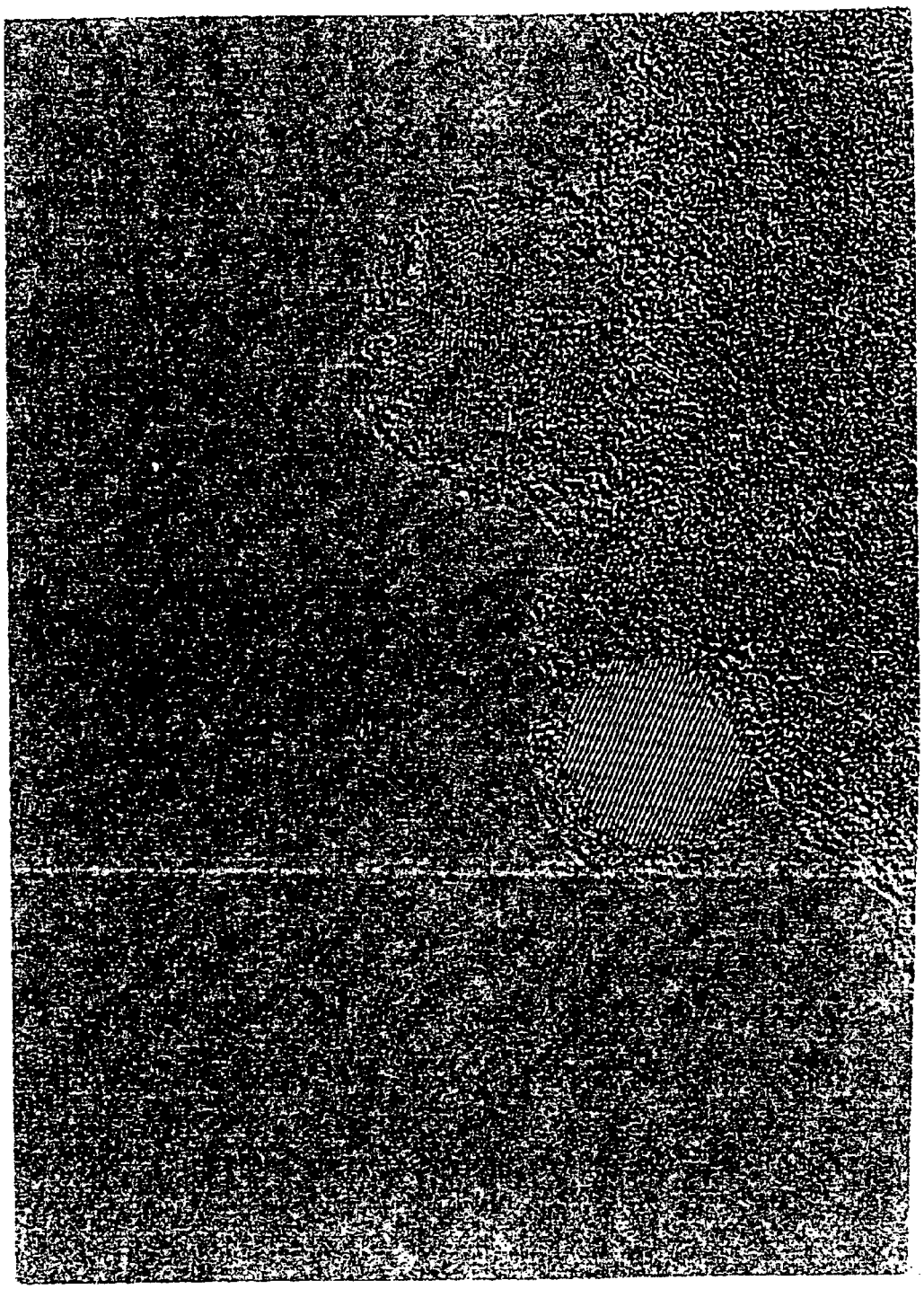
FIG. 13 is a transmission electron beam diffraction figure of a micro particle of quantum size effect.

FIG. 13 shows a transmission electron beam diffraction figure of the quantum size effect micro particle 3. The circular figure there seen is a cross sectional figure of the quantum size effect micro particle 3 mentioned above. Exhibiting a unique electron beam diffraction pattern of a single crystal in its center, this micro particle 6 is found to be of a single crystal. Covering up its periphery, there is also seen an amorphous figure which is a silicon oxide film that constitutes the insulating film 6. Also, supporting the quantum size effect micro particle 3 there is seen a further amorphous figure which is of a sample holding substance needed to perform the transmission electron beam diffraction.

Figure 3:
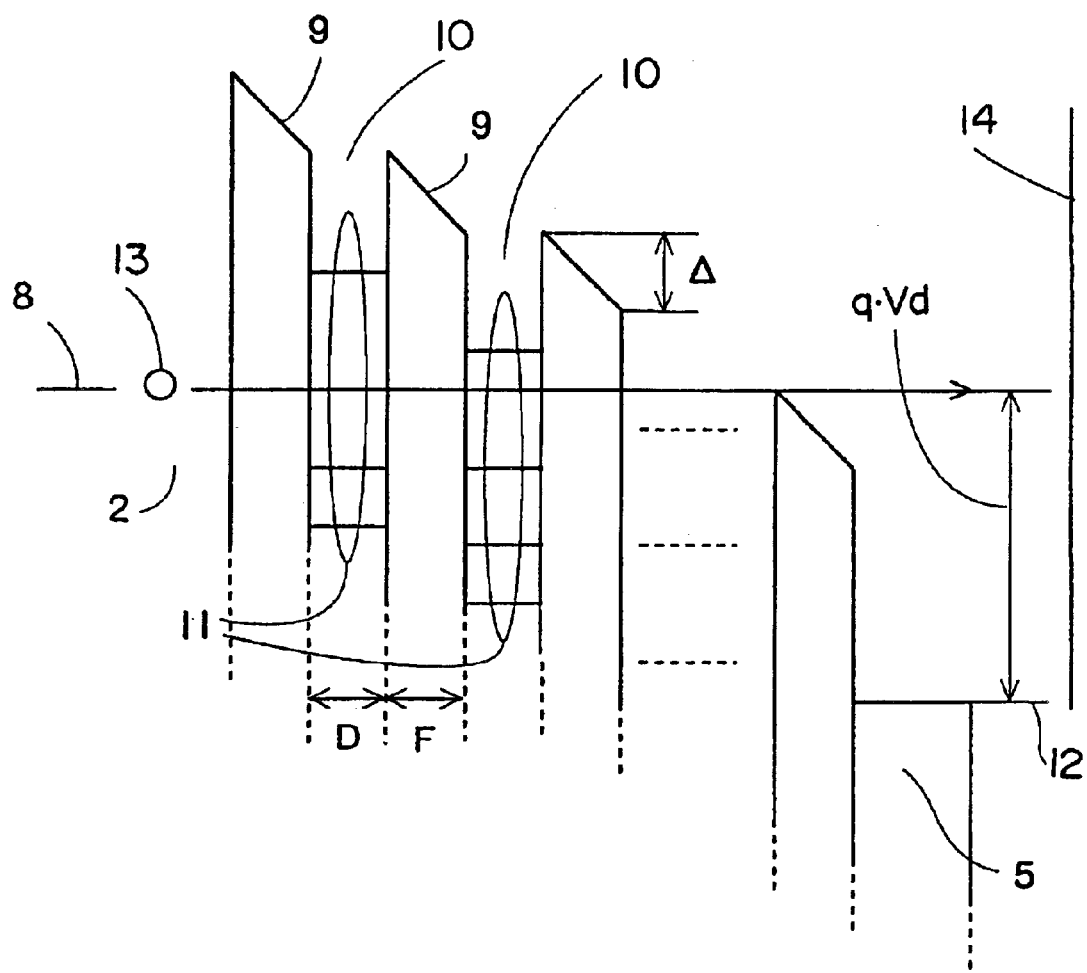
FIG. 3 is an electron energy band diagram used for the explanation of the operation of a micro electron gun of quantum size effect type in the first form of embodiment thereof.

FIG. 3 is an electron energy band diagram used for the explanation of the operation of a micro electron gun of quantum size effect type in the first form of embodiment thereof. It shows energy bands based on a one-dimensional model in the state that a diode voltage Vd is applied across the gap between the n-type semiconductor substrate 2 and the electrode 5.

Referring to FIG. 3, it is shown that the semiconductor substrate 2 has a Fermi energy level 8 and that potential barriers 9 are formed by the insulators 7 covering the surfaces of the quantum size effect micro particles 3 lying in tiers over the surface of the semiconductor substrate 2. Each of the potential barriers 9 has a width F that corresponds to the thickness F of the insulating film 7 and through which an electron is capable of tunneling.

It is also shown that potential wells 10 are formed by the single crystal micro particles 6 each constituting a central part of each quantum size effect micro particle 3 and the insulating films 7 lying on the surfaces of the single crystal micro particles, respectively. Each of the potential wells 10 has a width D that is equal or corresponds to the particle size D of each single crystal micro particle 6, which is such that the electron energy levels 11 in each potential level 10 are so discrete as not to bring about phonon scattering.

Because of a potential drop Δ produced in each potential barrier 9 due to the diode voltage Vd, neighboring potential barriers 9, 9, ... and neighboring potential wells 10, 10, ... range with potential drops Δ, Δ, ..., and connect to the electrode 5 at the distance L.

The electrode 5 has a Fermi level 12 that is lower than the Fermi level 8 of the n-type semiconductor substrate 2 by a potential difference which is equal to an amount of energy q×Vd (in terms of electron volt(s)) as the product of the diode voltage Vd and the electric charge q of an electron.

In this band structure, a conduction electron 13 in the n-type semiconductor substrate 2 may tunnel through the potential barriers 9 and may, without undergoing the phonon scattering in the potential wells 10, be accelerated by the electric field, arriving at the electrode 5. Consequently, the electron that has arrived at the electrode 5 will have an amount of energy that is greater than the Fermi level 12 of the electrode 5 by q×Vd.

Thus, making the voltage Vd applied to the electrode to correspond to its work function energy (i.e., if the electrode is made of gold having its work function energy of 5 eV, then applying 5 volts to the electrode) enables the electron 13 to be taken out into a vacuum.

In this manner, the micro electron gun of quantum size effect type according to the present invention is shown in the first form of embodiment to permit extracting an electron from a semiconductor crystal with a voltage no more than several volts applied. Thus, it is also possible to realize a display apparatus high in brightness having, as shown in FIG. 3, a counter electrode 14 provided with a luminescent element whereby applying an accelerating voltage Va across a gap between the electrode 5 and the counter electrode 14 to accelerate the electron extracted from the electrode 5 and to cause it to impinge on the luminescent element results in the emission of a light from the latter.

Figure 4:
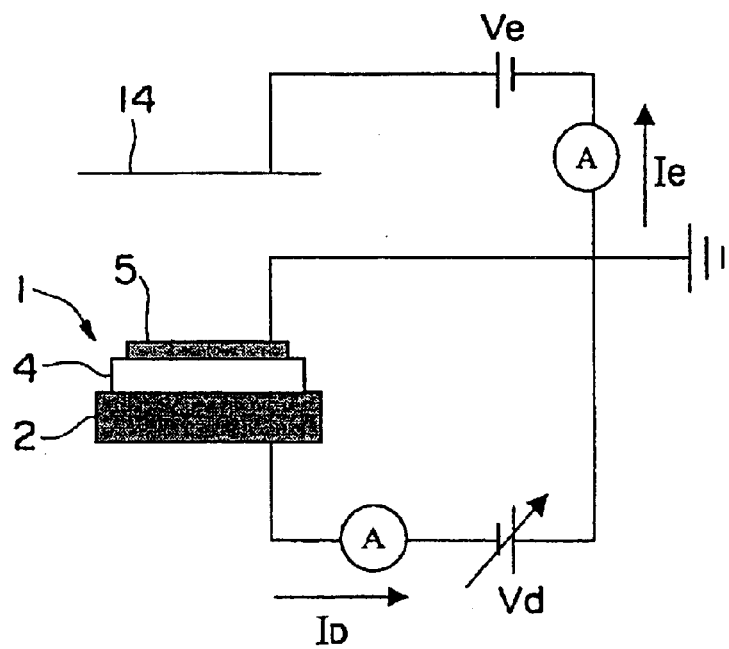
FIG. 4 is a circuit diagram illustrating a method of measuring an external quantum efficiency.

Mention is next made of the external quantum efficiency of a micro electron gun of quantum size effect type according to the present invention as implemented in the first form of embodiment shown and described. FIG. 4 is a circuit diagram illustrating a method of measuring the external quantum efficiency. Referring to FIG. 4, measurement is taken of diode current Id drawn between n-type Si substrate 2 and gold electrode 5 and emission current Ie drawn between the gold electrode 5 and the counter electrode 14 in the micro electron gun 1 of quantum size effect type when the diode voltage Vd is applied between the n-type Si substrate 2 and the gold electrode 5 and the accelerating voltage Ve is applied between the electrode 5 made of gold and the counter electrode 14. Here, the diode current Id is the sum of a flow of electrons extracted from the gold electrode 5 and arriving to the counter electrode 14 and a flow of electrons which for any cause fails to acquire an amount of energy not less than the work function energy, whereas the emission current Ie is the flow of electrons extracted from the gold electrode 5 and arriving to the counter electrode 14. Then, determination is made of the external quantum efficiency γ of the micro electron gun of quantum size effect type in this form of embodiment of the invention as being the quotient: the emission current Ie divided by the diode current Id.

Figure 5:
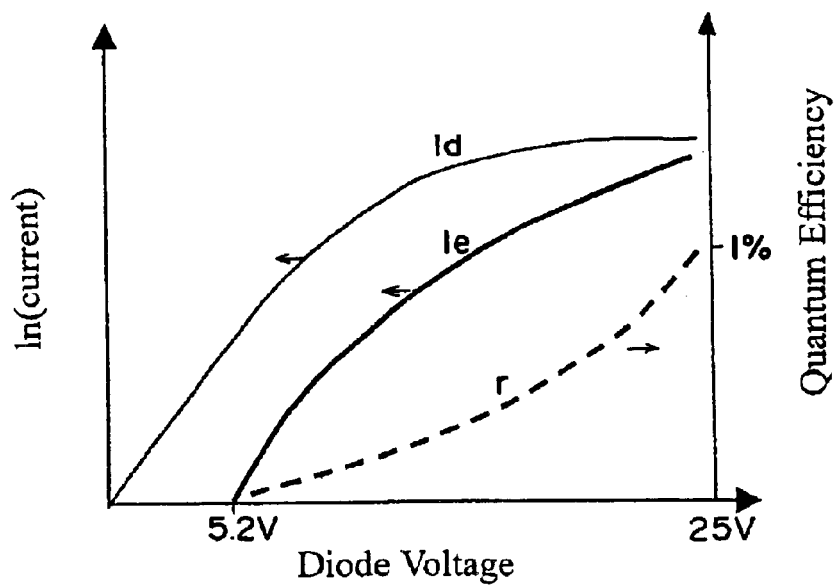
FIG. 5 is a graph showing results of measurement of the external quantum efficiency of a micro electron gun of quantum size effect type in the first form of embodiment thereof.

FIG. 5 is a graph showing results of measurement of the external quantum efficiency of the micro electron gun of quantum size effect type in this form of embodiment. Referring to FIG. 5, it is seen that the emission current Ie begins to flow when the diode voltage is at 5.2 volts and the external quantum efficiency γ reaches 1% when it is at about 25 volts.

Noting that the external quantum efficiency of an electron gun in the conventional CRT system is 0.1% or so, it is seen that the external quantum efficiency γ of an electron gun of quantum size effect type according to the form of embodiment illustrated of the invention is extremely high. Further, in the illustrated form of embodiment of the invention it is also found possible to raise the external quantum efficiency γ to 5% or so by reducing the surface energy level at the interface or boundary between the Si single crystal particle 6 and the insulating layer 7 (silicone oxide or silicon nitride film) of each quantum size effect micro particle 3.

Figure 6:
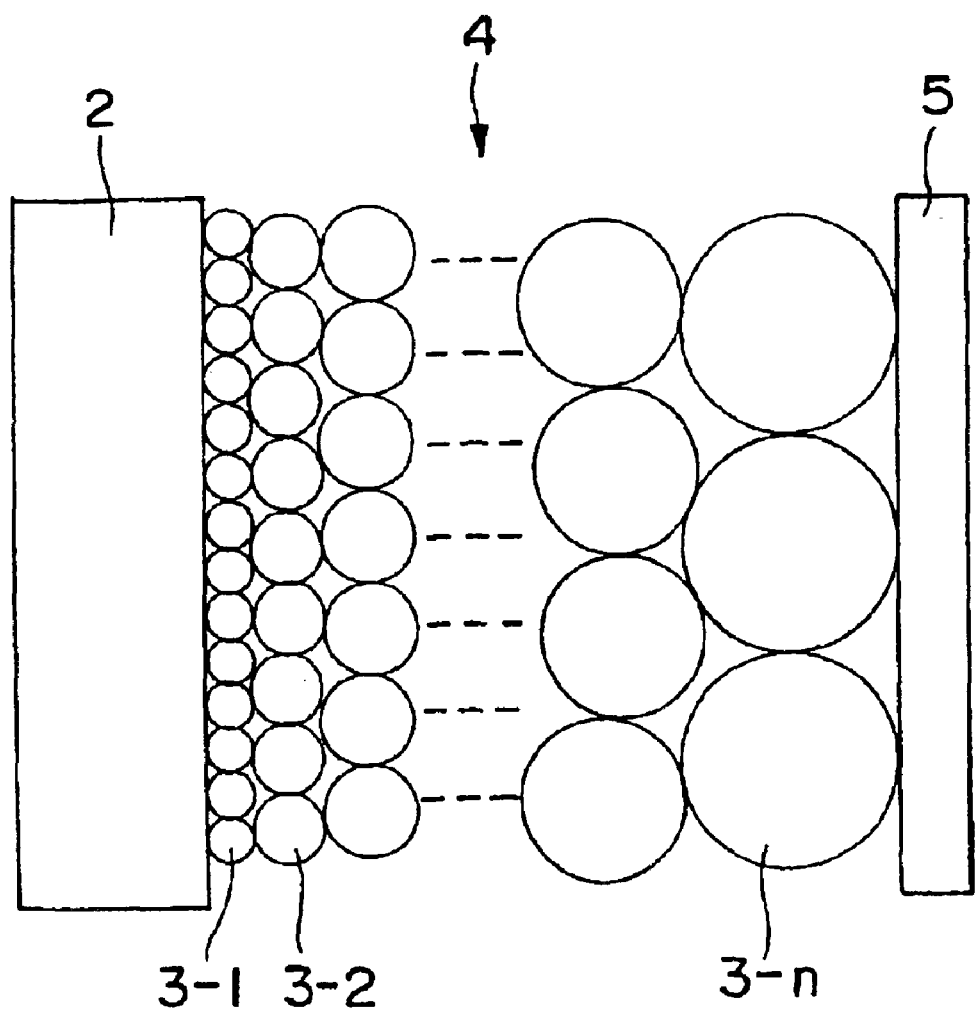
FIG. 6 is a diagrammatic structural view illustrating a second form of embodiment of the micro electron gun of quantum size effect type according to the present invention.

An explanation is next given in respect of a second form of embodiment of the micro electron gun of quantum size effect type according to the present invention. FIG. 6 is a diagrammatic structural view illustrating the second form of embodiment of the micro electron gun of quantum size effect type according to the present invention. While the electron gun in this form of embodiment is basically made up as in the first form of embodiment shown in FIG. 1, it here has quantum size effect micro particles 3 gradually varied in particle size D when they are placed one at side (or on top) of another. To wit, it is made to have a layer of quantum size effect micro particles 3-1 the smallest in particle size adjacent to the semiconductor substrate 2, next a layer of quantum size effect particles 3-2 larger than those, followed successively by layers of quantum size effect particles larger than them and successively larger in particle in size, and a layer of quantum size effect particles 3-n the largest in particle size adjacent to the electrode 5.

Figure 7:
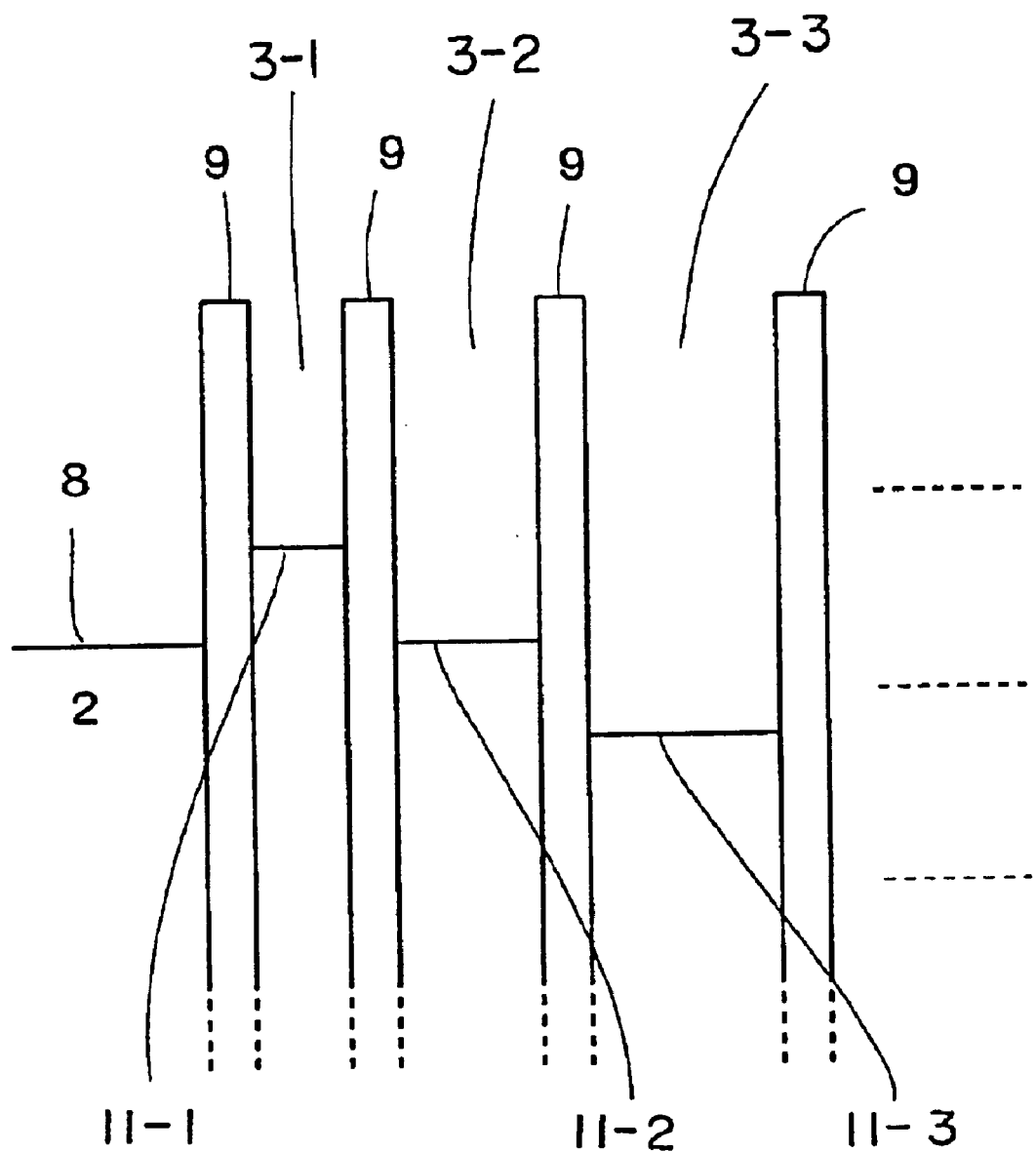
FIG. 7 is an electron energy band diagram used for the explanation of the operation of a micro electron gun of quantum size effect type according to the present invention in the second form of embodiment thereof.

FIG. 7 is an electron energy band diagram used for the explanation of the operation of a micro electron gun of quantum size effect type according to the present invention in the second form of embodiment thereof.

Quantum size effect micro particles 3 each in a nanometer order here have Si single crystal micro particles 6 as their individual cores. On this account, they form a band structure for an electron in which energy levels are not only discrete but also reflect both the periodic potential of the Si single crystal lattice and the diameters D of the Si single crystal micro particles 6. Thus, as the quantum size effect micro particles 3 are made greater in particle size D, in this band structure the band gap energy is made smaller in amount and the energy level of the band bottom is lowered.

Referring to FIG. 7, there are shown energy levels 11-1, 11-2 and 11-3 of the bottoms of the conduction bands for an electron in the layers of quantum size effect micro particles 3-1, 3-2 and 3-3. Thus, in the micro electron gun of quantum size effect type in the second form of embodiment of the invention an electron conducting from the n-type semiconductor substrate 2 to the electrode 5 is allowed to accelerate, even without an external voltage applied between the n-type semiconductor substrate 2 and the electrode 5, by an internal electric field produced due to the band structure having the conduction bands whose bottoms are successively lowered in energy level from the n-type semiconductor substrate 2 towards the electrode 5.

It is seen, therefore, that a micro electron gun of quantum size effect type in the second form of embodiment of the present invention allows an electron to be taken out into a vacuum at an external voltage lower than with a micro electron gun of quantum size effect type in the first form of embodiment of the present invention.

Figure 8:
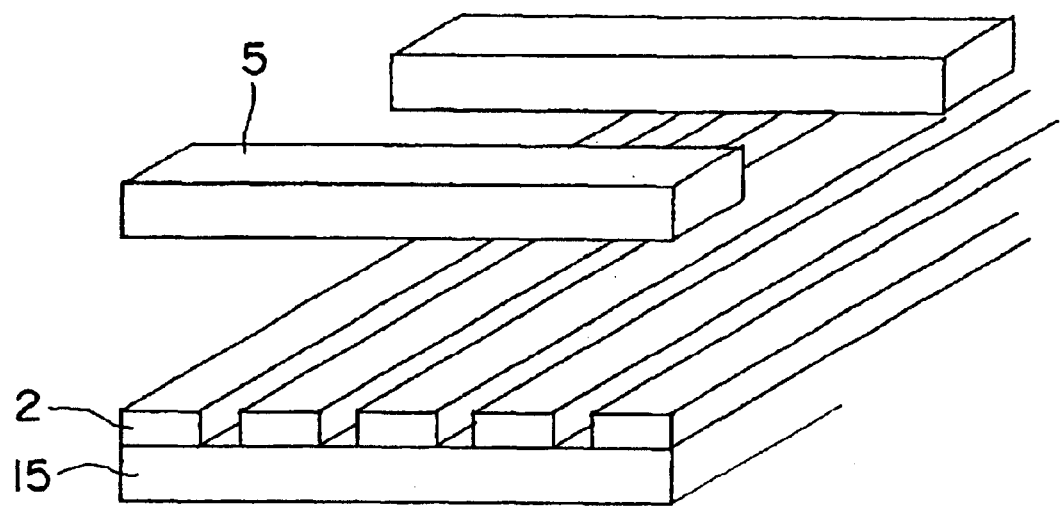
FIG. 8 is a diagrammatic structural view of a flat display using micro electron guns of quantum size effect type according to the present invention.
Figure 8:
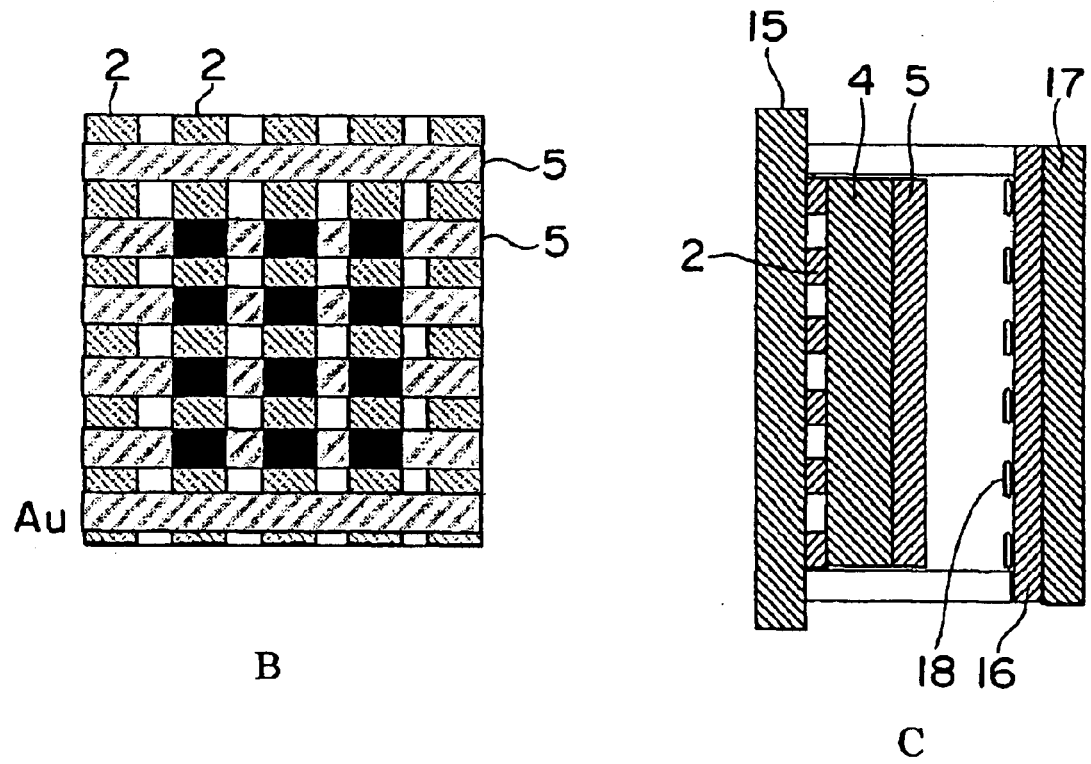

With reference to FIG. 8, an explanation is next given in respect of a flat display of the present invention using a micro electron gun of quantum size effect type in the first or second form of embodiment of the present invention as described above.

FIG. 8A is a perspective view showing the structure of a portion of electron guns in this flat display, FIG. 8B is a plan view thereof, and FIG. 8C is a cross sectional view used to explain the operation of this flat display.

Referring to FIG. 8A, the flat display includes an insulating or nonconductive layer 15 formed of, e.g., a silicon oxide film mounted on a base plate. Mounted on the insulating layer 15 are lower electrodes 2 formed of a semiconductor such as silicon and made up in a form of stripes spaced apart by an interval corresponding to a pixel size of the display. Placed on these lower electrodes 2 are, though not shown, layers of quantum size effect micro particles 3 which may be those described in connection with either the first or second form of embodiment mentioned above. On top of these layers there are placed upper electrodes 5 formed of, e.g., gold and made up in the form of stripes extending perpendicular to the lower electrodes 2 and spaced apart by an interval corresponding to the pixel size of the display.

As shown in the plan view of FIG. 8B, each area corresponding to each of the intersections of the upper and lower electrodes 5 and 2 (as seen from top or bottom) constitutes an electron gun corresponding to each of the pixels, respectively.

As shown in FIG. 8C, use is made, for example, of a transparent base plate 17 having a transparent electrode 16 with fluorescent or luminescent elements 18 mounted thereon, and the upper and transparent electrodes 5 and 16 have an accelerating voltage Ve applicable between them. Then, applying a diode voltage Vd between a particular upper electrode 5 and a particular lower electrode 2 selected corresponding to a particular pixel allows electrons to be emitted from only this pixel, and the accelerating voltage Ve applied as above permits them to be accelerated causing a light to be emitted from the fluorescent element corresponding to that pixel selected.

In any suitable peripheral area on the base plate or in its back side where no pixel exists, a pixel selection drive circuit may be mounted to permit any particular upper and lower electrodes 5 and 2 corresponding to any particular combination of pixels as required to be selected in response to a picture signal, thereby permitting a required picture to be displayed.

Thus, a flat display of the present invention with micro electron guns of quantum size effect type according to the present invention disposed corresponding to individual pixels is found to be high in quantum efficiency, to excel in brightness and can be made thin.

An explanation is next given in respect of a method of making quantum size effect micro particles 3 described in connection with the first and second forms of embodiment of the present invention.

Figure 9:
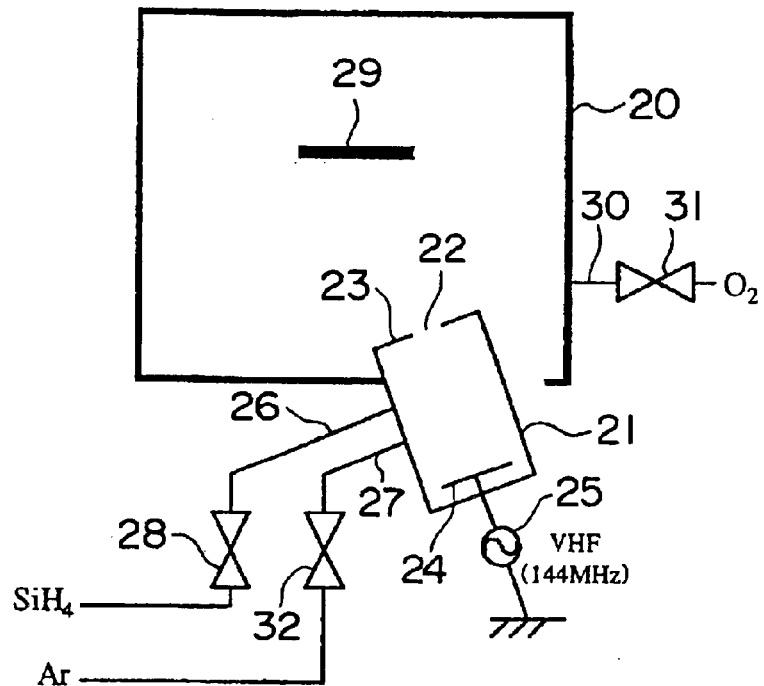
FIG. 9 is a diagrammatic view of the structure of an apparatus for making a quantum size effect micro particle.

FIG. 9 is a diagrammatic view of the structure of an apparatus for making quantum size effect micro particles.

A quantum size effect micro particle that can be made by this apparatus may be a quantum size effect micro particle which consists of a Si single crystalline particle and a $SiO_2$ film with which its periphery is covered.

Referring to FIG. 9, the apparatus includes an ultrahigh vacuum chamber 20, and a plasma cell 21 that is provided with a stainless steel target 24 connected to a VHF power supply 25 (with an output frequency of 144 MHz) and that has a base 23 formed with an opening 22 communicating with the ultrahigh vacuum chamber 20. The base 23 is connected to a ground potential. The plasma cell 21 is fitted with pipe lines 26 and 27 for introducing $SiH_4$ (silane) and Ar into the cell 21 via flow control valves 28 and 32, respectively.

The ultrahigh vacuum chamber 20 has a substrate 29 placed therein practically opposing to the opening 22, and also has a pipe line 30 connected thereto for introducing $O_2$ into the chamber 20 via a flow control valve 31. It should be noted further that the ultrahigh vacuum chamber 20 is also fitted with a pump for establishing an ultrahigh vacuum therein, such as a turbo molecular pump, a shutter and a substrate heater, all of which are omitted from illustration for the sake of simplicity.

Mention is next made of a method of forming quantum size effect micro particles by the quantum size effect micro particle making apparatus shown in FIG. 9.

Figure 10:
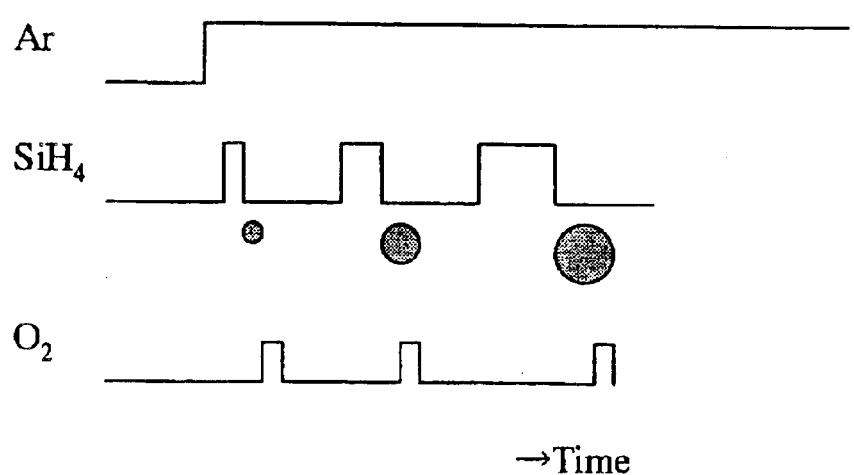
FIG. 10 shows gas inlet timing charts for Ar, $SiH_4$ and $O_2$ gases, respectively.

FIG. 10 shows gas inlet timing charts for Ar, $SiH_4$ and $O_2$ gases, respectively. In the charts or graphs with their abscissa indicating time, the High and Low portions represent the time periods in which a flow of gas is present and absent, respectively.

As shown in the timing charts of FIG. 10, initially Ar gas is introduced with a preselected rate of flow and under a preselected pressure into the plasma cell 21 via the valve 32 and the pipe line 27 and the VHF power supply 25 (with an output frequency of 144 MHz) is activated to excite the Ar gas in the cell 21, thereby producing a VHF-band plasma therein. Next, as shown in FIG. 10, $SiH_4$ gas is introduced into the VHF-band plasma for a preselected pulse duration via the valve 28 and the pipe line 26. $SiH_4$ is excited in the plasma, giving rise to $SiH_2$ and $SiH_3$ radicals and $SiH_n^+$ ions where n=0 to 3. $SiH_2$ radicals which are short in life combine with one another to form crystal nuclei of Si single crystal micro particles 6, at which $SiH_3$ radicals and $SiH_n^+$ ions (n=1–3) arrive to cause growth of Si crystals, whereby the Si single crystal micro particles are formed. These Si single crystal micro particles 6 by diffusion pass through the opening 22 into the ultrahigh vacuum chamber 20, then reaching the substrate 29 on which they are deposited. Subsequently, as shown in FIG. 10, $O_2$ gas is introduced into the ultrahigh vacuum chamber 20 for a preselected pulse duration via the valve 31 and the pipe line 30 to oxidize the surfaces of the Si single crystal micro particles 6 deposited on the substrate 29. The result of the above process is the formation of a layer of the quantum size effect micro particles 3, and when repeated, eventually a number of layers of them, on the substrate.

The longer the pulse duration made in which $SiH_4$ is introduced, the larger will the particle size of the quantum size effect micro particles 3 be. Thus, in order to form layers of quantum size effect micro particles 4 which as described earlier in connection with the second form of embodiment have the particle size D of quantum size effect micro particles 3 made greater successively from one layer to the next, the pulse duration in which SiH$_4$ is introduced or flushed each cycle is made larger successively from one cycle to the next so that the Si single crystal micro particles 6 are then made successively larger in size D. The SiH$_4$ flushing timing chart in FIG. 10 is shown accompanied by circles which indicate that the particle size of quantum size effect particles changes according to the flushing pulse duration.

An example of the forming conditions is shown below.

| | |
|---|---|
| Volume of the plasma cell: | 230 cm$^3$ |
| Plasma power: | 3 watts |
| Ar flow rate: | 30 sccm |
| SiH$_4$ flow rate: | 2 sccm |
| SiH$_4$ partial pressure: | 0.42 torr |
| O$_2$ purging time duration: | 1 second |

Figure 11:
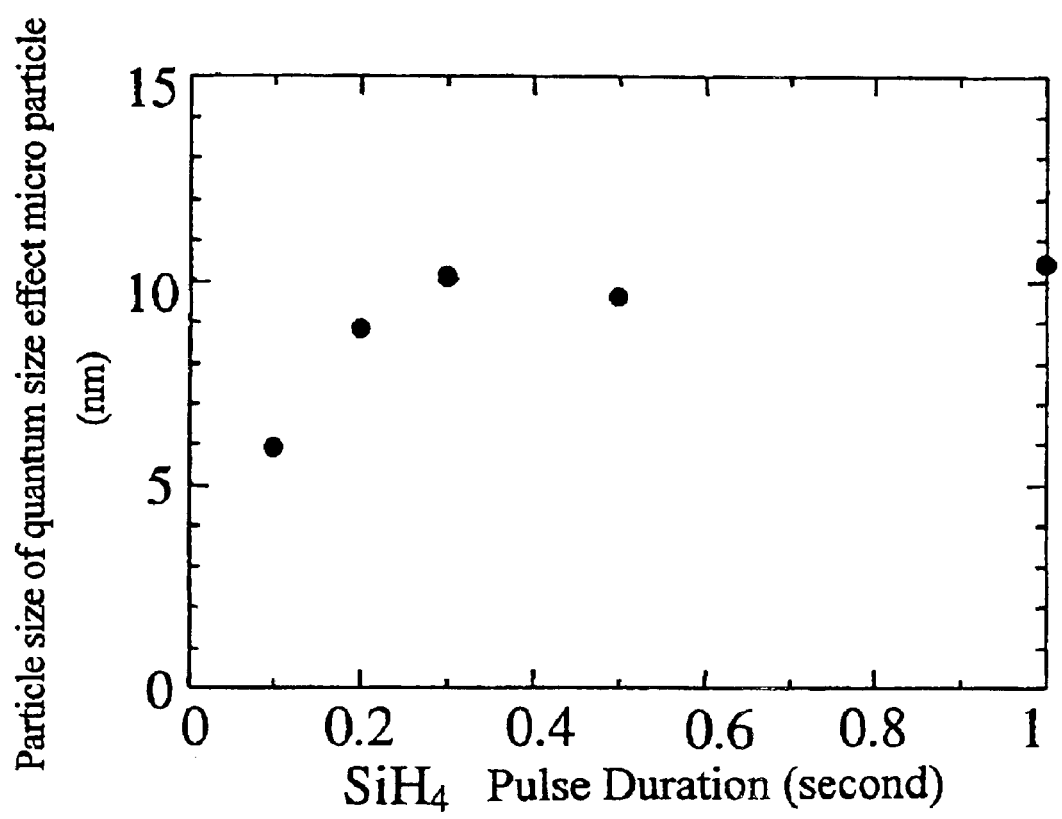

FIG. 11 shows values of the particle size of the formed quantum size effect micro particles changing as a function of the SiH$_4$ flushing pulse time duration varied from 0.1 to 1 second.

An explanation is next give in respect of a method of making a flat display of the present invention using micro electron guns of quantum size effect type of the present invention in either the first or second form of embodiment thereof.

Figure 12:
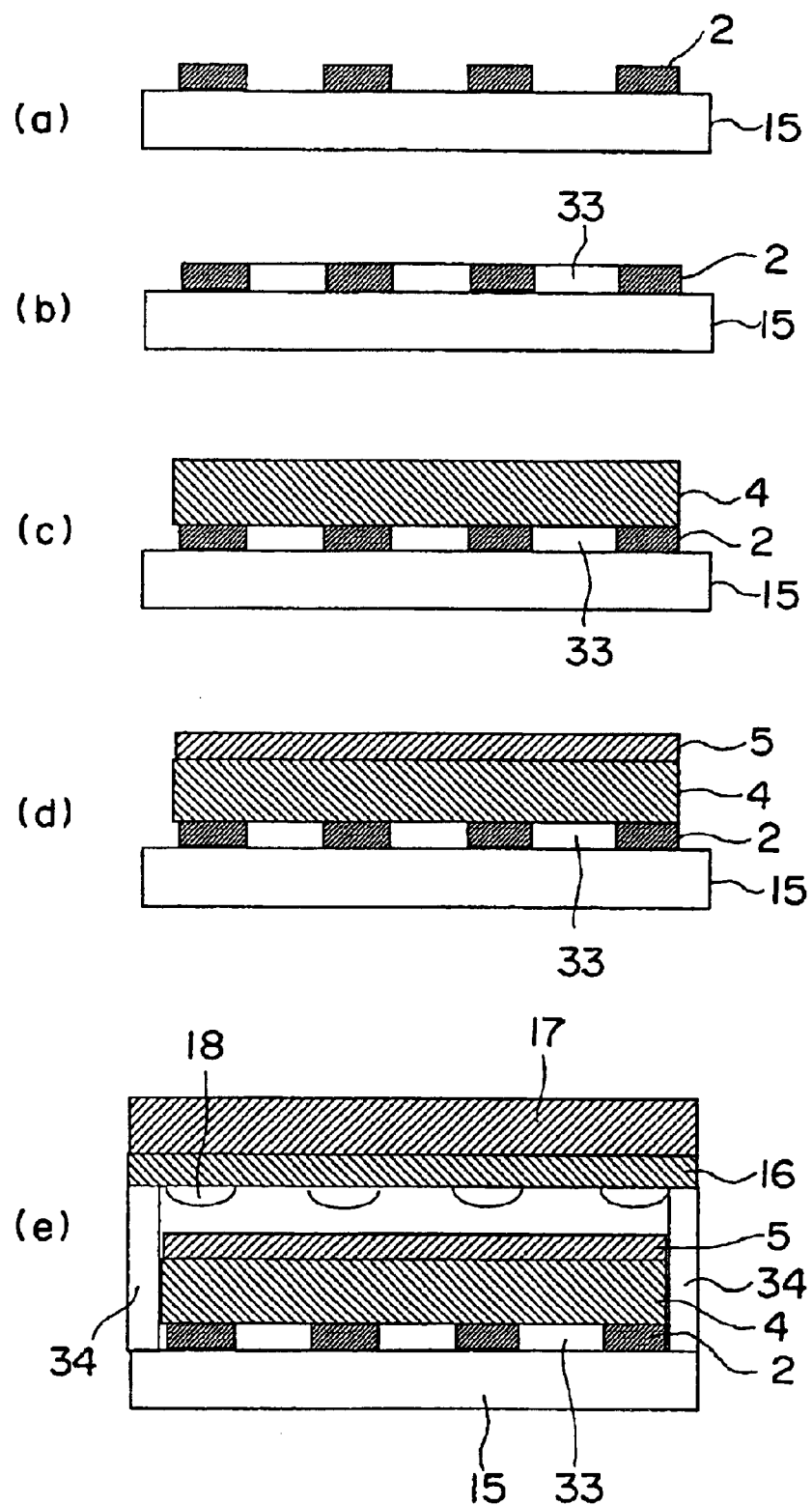
FIG. 12 is a flow chart of principal process steps entailed, illustrating a method of making a flat display in accordance with the present invention.

FIG. 12 is a flow chart of principal process steps entailed, illustrating a method of making a flat display in accordance with the present invention. As shown in FIG. 12(a), an insulating base plate 15 has a n-type single crystal film formed thereof, which is then etched to form lower electrodes 2 in the form of stripes. Next, as shown in FIG. 12(b), interstices between adjacent lower electrodes 2 are filled with insulating media 33 by forming insulating films on open surfaces of the base plate in a planarizing etching or like process. Subsequently, as shown in FIG. 12(c), on the resultant surface there is formed a layer 4 of tiers of quantum size effect micro particles using the quantum size effect micro particle making method and apparatus mentioned hereinbefore. Next, as shown in FIG. 12(d), the surface of this has an electrode material such as gold formed thereon, which is then etched to form upper electrodes 5 in the form of stripes as mentioned earlier. Finally, as shown in FIG. 12(e), a transparent substrate 17 having a transparent electrode 16 fitted with fluorescent bodies 18 is mounted above the resultant surface via a spacer 34.

INDUSTRIAL APPLICABILITY

As will be apparent from the foregoing description, a micro electron gun of quantum size effect type according to the present invention wherein layers of quantum size effect micro particles are formed on a semiconductor substrate to make longer the mean free path for electrons conducting therethrough makes it easier to take out electrons, is high in quantum efficiency and can be made smaller in size. Hence, the present invention in this aspect is applicable very well to a flat display apparatus.

Further, a flat display apparatus obtained in this way, with each of the micro electron guns of quantum size effect type readily assignable to each of the pixels required, can be manufactured easily, and because of their exalted quantum efficiency is of power-saving type and high in brightness, and can be made thin.

Moreover, using a method of manufacture of the invention as described allows layers of quantum size effect micro particles to be formed as required.

What is claimed is:

1. A method of making quantum size effect micro particles, characterized in that it comprises the steps of:

introducing silane into a VHF-band plasma of argon while controlling the time duration in which the silane is so introduced to form Si single crystal micro particles with their particle size controlled;

forming on a substrate a layer of said Si single crystal micro particles so formed; and converting respective surface areas of the said Si single crystal micro particles in said layer on said substrate into insulating films.

2. A method of making quantum size effect micro particles as set forth in claim 1, characterized in that the step of forming Si single crystal micro particles comprises:

forming SiH$_2$ radical, SiH$_3$ radical and SiH$_n^+$ ions (where n=0 to 3) in said VHF-band plasma of argon;

forming nuclei of said Si single crystal micro particles from the SiH$_2$ radical; and bonding the SiH$_3$ radical and SiH$_n^+$ ions (where n=0 to 3) to said nuclei to cause the latter individually to crystallographically grow, thereby forming the Si single crystal micro particles.

3. A method of making quantum size effect micro particles as set forth in claim 1, characterized in that the step of forming a layer of Si single crystal micro particles on a substrate comprises causing the Si single crystal micro particles to diffuse following a concentration gradient thereof, followed by their arrival to and deposition on said substrate, forming there said layer thereof.

4. A method of making quantum size effect micro particles as set forth in claim 1, characterized in that the step of converting respective surface areas of said single crystal micro particles in said layer on said substrate into insulating films comprises exposing said Si single crystal micro particles to a gas atmosphere of O$_2$ or N$_2$ to oxidize or nitrify the respective surface areas thereof.

5. A method of making quantum size effect micro particles as set forth in claim 1, characterized in that the step of converting respective surface areas of said single crystal micro particles in said layer on said substrate into insulating films comprises exposing said Si single crystal micro particles to a gas plasma of O$_2$ or N$_2$ to oxidize or nitrify the respective surface areas thereof.

6. A method of forming layers of quantum size effect particles, characterized in that it comprises repeating a process comprising steps as set forth in claim 1.

* * * * *